United States Patent Office 2,897,046
Patented July 28, 1959

2,897,046

SEPARATION OF THORIUM FROM URANIUM BY EXTRACTION

Edward G. Bohlmann, Oak Ridge, Tenn., assignor to the United States of America as represented by the United States Atomic Energy Commission No Drawing. Application October 16, 1951
Serial No. 251,620

19 Claims. (Cl. 23—14.5)

This invention deals with the separation and recovery by extraction of uranium values and thorium values from solutions containing both.

It is an object of this invention to provide a process for selectively extracting uranium and thorium values by which a high degree of recovery is accomplished.

It is an object of this invention to provide a process for selectively extracting uranium and thorium values by which a high degree of separation and thus a uranium and a thorium product of high purity are obtained.

It is also an object of this invention to provide a process for the separation of rare earth metal values, uranium values and thorium values from each other which are contained in a solution.

It has been found that in extracting thorium values from aqueous solutions by means of tributyl phosphate, the concentration of the nitric acid is critical. While at an acidity of above 3 N, the thorium is preferentially extracted into the tributyl phosphate, it is preferentially retained in the aqueous phase at an acidity of below 3 N nitric acid. In contradistinction thereto, the uranium values are always preferentially taken up or held back by the tributyl phosphate phase whenever any substantial amount of acid is present in the aqueous solution. These facts have been utilized in devising the process of this invention for the separation of thorium and uranium.

The process of this invention comprises the steps of providing an aqueous phase of a maximum nitric acid content of 3 N and a tributyl phosphate phase whereby either of these two phases may initially have all of the dissolved uranium and thorium values, thoroughly contacting the two phases whereafter said thorium values are preferentially found in said aqueous phase while said uranium values are preferentially contained in said tributyl phosphate phase, and separating the aqueous phase from the tributyl phosphate phase obtained.

There are two principal embodiments of the process of this invention: the selective extraction may be either carried out from an aqueous phase by means of the tributyl phosphate, or else it may be effected with an aqueous phase from a tributyl phosphate phase. In either case, the aqueous solution has to have an acidity below 3 N nitric acid in order to obtain satisfactory separation.

The latter embodiment, namely, the extraction from tributyl phosphate, may be preceded by coextraction of both thorium and uranium values from an aqueous phase which has a nitric acid concentration of above 3 N; by this step, uranium and thorium values may be separated from other nonextractable elements present in the aqueous solution. After coextraction, the thorium may then be selectively back-extracted into an aqueous medium by using nitric acid of a concentration below 3 N. After the aqueous thorium-containing extract phase has been separated from the remaining uranium-containing solvent phase, the uranium may finally also be stripped into an aqueous medium, for instance by contacting the tributyl phosphate phase with water. Instead of water, a carbonate solution, which acts a a complexing agent for the uranium, may also be advantageously used. Thereafter, the tributyl phosphate is ready for re-use in the process.

Commercial tributyl phosphate mostly contains small quantities of mono- and dibutyl phosphates both of which have a complexing action on uranium and thorium so that the solvent extraction is more or less impaired by these contaminations. For this reason, it is advisable to subject the tributyl phosphate to a pretreatment with aqueous sodium hydroxide or sodium carbonate whereby the mono- and dibutyl phosphates are removed from the organic substance.

Tributyl phosphate has a rather high viscosity which makes the phase separation difficult. It has therefore been held advisable to add a diluent to the tributyl phosphate. Low viscosity solvents which have a specific gravity less than that of water and preferably below 0.8 and which are miscible with tributyl phosphate have been found suitable for the process of this invention. Hydrocarbons such as hexane, n-heptane, n-octane, decane, n-alkanes having twelve, thirteen or fourteen carbon atoms in the chain, cyclohexane, methyl cyclohexane, benzene and kerosene are proper. Also mixtures of hydrocarbons such as petroleum fractions have been found satisfactory; in particular, the fractions sold under the trade-names of "Esso Varsol" and "Gulf BT" have given satisfactory results. "Varsol" consists of about 60% paraffin, 30% naphthene and 10% aromatics; it has a specific gravity of 0.75, a boiling point of between 167° and 180° C. and a flash point of 49° C. "Gulf BT" has very similar chemical and physical properties. "Varsol," however, was found to react with concentrated nitric acid, for instance with nitric acid of above 9 N even at room temeprature. This difficulty can be easily overcome, though, and the "Varsol" can be stabilized by pretreating it with concentrated nitric acid whereby the reactive component is removed. "Gulf Spray Naphtha," a purified kerosene fraction sold by Gulf Oil Co., has been found excellently well qualified as a diluent for the process of this invention.

Another group of diluents found suitable are oxygen-containing organic solvents such as ethers and esters. Examples of diluents of this class are dibutyl ether, isoamyl acetate, diisopropyl ether, pentaether (dibutoxy-tetraethylene glycol), or mixtures thereof.

The addition of diluents to alkyl phosphate extractants forms the subject matter of the assignee's copending applications, Serial No. 190,866, filed on October 18, 1950, by James C. Warf, and Serial No. 190,867, filed on October 18, 1950, by Oliver Johnson.

While quantities of from 20 to 80% by volume have been found suitable for the diluent, a proportion of about 50% diluent and 50% tributyl phosphate is the preferred ratio. All of the diluents listed above together with tributyl phosphate show a high stability to nitric acid. For instance, equilibration of the 50–50 hexane-tributyl phosphate mixture with from 1 to 11 N nitric acid for over two hundred hours showed no attack of the solvent by the nitric acid. It is advantageous to pre-equilibrate the solvent-diluent mixture with nitric acid prior to extraction in order to minimize acid transfer from the aqueous phase to the solvent phase.

While it has been set forth above that for the solvent co-extraction, the nitric acid content should be above 3 N, it is preferred to have a concentration of between 6 and 7.5 N; the very best results were obtained with an acidity of from 7 to 7.5 N. Likewise, the preferred acid concentration for selective thorium back-extraction from tributyl phosphate is from 0.1 to 1 N, the optimal conditions being obtained with a concentration of from 0.1 to 0.5 N.

In the following Table I the results of extraction experiments using various acid concentrations are compiled. The distribution coefficients (organic/aqueous) of nitric acid, thorium and uranium are shown. These values were obtained with a mixture of 50% by volume of hexane and 50% by volume of tributyl phosphate. The feed solution used, in each case, contained 0.2 M uranyl nitrate, 0.2 M thorium nitrate and nitric acid in the concentration shown. In each experiment, 10 cc. of aqueous phase were equilibrated with 10 cc. of solvent mixture for thirty minutes at 77° F.

TABLE I

| Orig. $HNO_3$ concn. in aq. phase, N | Distribution coefficients (organic/aqueous) | | |
|---|---|---|---|
| | $HNO_3$ | Th | U |
| 1 | 0.65 | 0.66 | 11 |
| 3 | 0.40 | 1.6 | 20 |
| 5 | 0.31 | 2.1 | 28 |
| 7 | 0.24 | 2.3 | 14 |
| 9 | 0.20 | 2.6 | 13 |
| 11 | 0.19 | 3.8 | 8.9 |

These experiments confirm that the thorium extraction increases considerably with increasing nitric acid concentration and that the aqueous phase is preferred by the thorium only at nitric acid concentrations below 3 N. On the other hand, the uranium is always preferentially taken up or retained, as the case may be, by the solvent phase.

The volumes of the two phases used are not critical and are dependent to a certain degree on the concentration of the thorium and uranium values therein. However, equal volumes of solvent and aqueous phases have been found satisfactory for the coextraction of uranium and thorium values while for the selective thorium back-extraction from tributyl phosphate or for the selective uranium extraction from an aqueous phase, two volumes of aqueous solution per one volume of organic solution were found suitable. For the back-extraction of uranium from the solvent phase by means of water or carbonate solution, a ratio of one volume of aqueous medium per two to four volumes of solvent have been found suitable, the ratio of 1:3 being the preferred one.

In the extraction steps of the process of this invention, the addition of a nitrate as salting-out agent is not necessary since the high concentration of nitric acid has sufficient salting-out effect.

In carrying out the various extraction steps, it is always advantageous for better separation to use a scrubbing after-treatment. Thus, in the case of extraction from aqueous phase, scrubbing of the solvent extract phase obtained with a nitric acid of similar concentration as that of the aqueous phase increases the separation; on the other hand, when extracting from the solvent by means of a nitric acid solution, scrubbing with a tributyl phosphate-diluent mixture is proper.

The concentration of the aqueous solution to be treated is not critical; however, a thorium nitrate concentration ranging from 0.3 to 0.5 M and preferably from 0.3 to 0.35 M has given the best results.

In the following examples are given which illustrate preferred embodiments of the process of this invention.

*Example I*

Experiments were carried out with a tributyl phosphate solution of uranium and thorium nitrates; the thorium was selectively back-extracted using an extraction system. Six stages of thorium back-extraction and five stages of scrubbing were applied, using separatory funnels and successive batch extractions to simulate column operation. The organic "feed" solution consisted of 50% by volume of tributyl phosphate and 50% hexane; it was 0.74 M in nitric acid and contained 1410 mg. of thorium dioxide in the form of nitrate and 122 mg. of uranosic oxide (as nitrate) per 25 ml. of solution. The aqueous back-extracting or stripping solution was 0.184 N in nitric acid. The organic scrub solution was also a 50-50 tributyl phosphate-hexane mixture. The volume ratios of aqueous strip:organic feed:organic scrub solutions were 2:1:1. The aqueous and organic phases obtained after extraction were analyzed; the results are compiled in Table II.

TABLE II

| Stage No. and type | Content in total aqueous phase | | Content in total organic phase | | Distribution ratio (organic/aqueous) | | Separation factor $U_3O_8/ThO_2$ |
|---|---|---|---|---|---|---|---|
| | $ThO_2$, mg. | $U_3O_8$, mg. | $ThO_2$, mg. | $U_3O_8$, mg. | $ThO_2$ | $U_3O_8$ | |
| 1. Stripping | <0.1 | 70 | <0.1 | 88 | | 1.3 | |
| 2. Stripping | <0.1 | 94 | <0.1 | 157 | | 1.7 | |
| 3. Stripping | 380 | 61 | <0.2 | 181 | <0.0005 | 3.0 | >6,000 |
| 4. Stripping | 1,070 | 45 | 380 | 149 | 0.35 | 3.3 | 9 |
| 5. Stripping | 1,900 | 17 | 1,070 | 133 | 0.56 | 7.8 | 14 |
| 6. Feed | 2,200 | 10 | 2,017 | 139 | 0.91 | 14 | 15 |
| A. Scrubbing | 2,160 | 1.6 | 930 | 9.8 | 0.86 | 12 | 14 |
| B. Scrubbing | 2,080 | <0.3 | 870 | >1.5 | 0.84 | >>10 | >>12 |
| C. Scrubbing | 1,830 | <0.1 | 790 | 0.22 | 0.86 | >4.4 | >5 |
| D. Scrubbing | 1,670 | <0.1 | 540 | <0.1 | 0.65 | | |
| E. Scrubbing | 1,100 | <0.1 | 380 | <0.1 | 0.69 | | |

The analyses of these solutions summarized above show that a thorium product containing less than 50 p.p.m. of uranium and a uranium product containing less than 800 p.p.m. of thorium were obtained.

*Example II*

A synthetic feed solution containing thorium nitrate, uranyl nitrate and nitric acid in the amounts shown in the following table was extracted with a 50-50 mixture of tributyl phosphate-Gulf Spray Naphtha, and the organic phase formed was scrubbed with 4 N nitric acid. The extractant was introduced at the bottom of a column, the aqueous scrub solution at the top and the feed at the fifth stage from the top of the column. This gave nine extraction stages below and four scrub stages above the feed stage. The flow rate used for the feed solution was 274 ml./hr., and the relative flow rates of feed:scrub:extractant were 1.0:0.3:2.2. A mechanical stirrer in the column operated with 1100 r.p.m. The results of this experiment are shown in Table III.

TABLE III

|  | Mg./100 ml. | Total volume, ml. | Total, mg. | Material balance, percent | $HNO_3$, N | Percent extraction |
| --- | --- | --- | --- | --- | --- | --- |
| Feed: |  |  |  |  |  |  |
| $ThO_2$ | 7,100 | 274 | 19,454 | ---------- | 5.9 | ---------- |
| $U_3O_8$ | 678 | 274 | 1,858 | ---------- |  | ---------- |
| Organic extractant: |  |  |  |  |  |  |
| $ThO_2$ | 3,360 | 600 | 20,160 | 104 | 1.1 | ---------- |
| $U_3O_8$ | 338 | 600 | 2,028 | 109 |  | ---------- |
| Aqueous raffinate: |  |  |  |  |  |  |
| $ThO_2$ | 0.045 | 357 | 0.16 | ---------- | 3.8 | 99.999 |
| $U_3O_8$ | 0.0022 | 357 | 0.008 | ---------- |  | 99.999 |

The organic phase obtained in the previous coextraction step was then separated from the remaining aqueous phase and selectively stripped. For this purpose, it was introduced as the feed at the seventh stage from the top of an extraction column, and an aqueous stripping solution was introduced at the top of the column; the stripping solution was 0.2 N nitric acid. At the bottom of the column an organic scrub solution consisting of 50–50 tributyl phosphate-Gulf Spray Naphtha mixture was introduced. The arrangement gave six extraction stages above and seven scrub stages below the feed stage. The feed had a flow rate of 330 ml./hr., and the flow ratio for feed:scrub:extractant was 1:1.5:2.3. The stirrer was again operated with a speed of 1100 r.p.m. The results of this selective thorium extraction are given in Table IV.

It has been found advantageous to add nitric acid for this dissolution step in a quantity to obtain a concentration of from 9 to 11 N and preferably of 9 N, because at this concentration the formation of a titanium complex is prevented and the removal of the titanium phosphate and also of the gangue, e.g. by filtration, is facilitated. Heating of the mixture to 175° F. for one hour still furthermore improves the titanium separation. After the filtration or any equivalent operation, the concentration of the nitric acid is then adjusted to that preferred for coextraction of uranium and thorium, namely, to a value of from 7 to 7.5 N. This solution, when contacted with a tributyl phosphate-diluent mixture retains most of the rare earth metal values while the bulk of the uranium and thorium values are taken up by the tributyl phosphate phase. While the temperature of the solution

TABLE IV

|  | $ThO_2$ | | | | $U_3O_8$ | | | | $HNO_3$, N | $U_3O_8$ in $ThO_2$ | $ThO_2$ in $U_3O_8$ | Separation factor |
| --- | --- | --- | --- | --- | --- | --- | --- | --- | --- | --- | --- | --- |
|  | Mg./100 ml. | Total vol., ml. | Total, mg. | Material bal., percent | Mg./100 ml. | Total vol., mg. | Total, mg. | Material bal., percent |  |  |  |  |
| Feed | 4,050 | 166 | 6,720 | ---------- | 366 | 166 | 608 | ---------- | 1.0 | 90 × 10³ | 11 × 10⁶ | ---------- |
| Aqueous stripping solution | 1,760 | 380 | 6,690 | 102 | <0.02 | 380 | <0.08 | 108 | 0.4 | <12 | ---------- | ¹ >7,500 |
| Organic raffinate | 37 | 405 | 150 |  | 162 | 405 | 656 |  | 0.08 | ---------- | 23 × 10⁴ | ² 48 |

¹ Uranium separation factor = $\dfrac{U_3O_8 \text{ in } ThO_2, \text{ p.p.m., in feed}}{U_3O_8 \text{ in } ThO_2, \text{ p.p.m., in aqueous stripping solution}}$ ² Thorium separation factor = $\dfrac{ThO_2 \text{ in } U_3O_8, \text{ p.p.m., in feed}}{ThO_2 \text{ in } U_3O_8, \text{ p.p.m., in organic raffinate}}$ The process of this invention is very well qualified for the separation and recovery of uranium and thorium from monazite sand solutions. The most commonly used processes for preparatory treatment of monazite sand comprise roasting with sodium hydroxide or heating with a hot concentrated sodium hydroxide solution, whereby the metal phosphates of the monazite are converted to oxides. In the first case the mass is then leached with water and in the latter it is diluted with water so that the undissolved metal oxides can be separated, e.g. by filtration, from the solution of sodium phosphate formed and excess sodium hydroxide. The separated oxides are then dried and dissolved in hydrochloric acid. The hydrochloric acid solution thus obtained is then neutralized with sodium hydroxide until a pH value of 5.8 is obtained; at this point thorium and uranium, together with approximately 3% of the total rare earth metal values contained in the monazite, precipitate while the balance of the rare earth metals remains in solution. The precipitate is separated, dried and dissolved in nitric acid.

does not have any effect on the extraction of the rare earth metal values, a decrease of the temperature increases materially the extraction of uranium and thorium; consequently, the separation of uranium and thorium from rare earth metal values may be improved by a decrease of temperature.

*Example III*

A semi-process feed solution was used which was obtained by combining equal volumes of the 7 to 7.5 N nitric acid-monazite sand solution prepared by the process just described in the preceding paragraph and of a synthetic aqueous nitric acid solution containing uranyl and thorium nitrates. The extraction was carried out with a 50–50 mixture of tributyl phosphate and Gulf Spray Naphtha. The flow rate of the aqueous feed solution was 453 ml./hr., and the volume ratio of feed:scrub:extractant was 1:0.5:2.1. The stirrer operated at a speed of 1100 r.p.m. The results of the coextraction step are compiled in Table V.

TABLE V

| | Mg./100 ml. | Total vol., ml. | Total, mg. | Material bal., percent | $HNO_3$, N | Extraction, percent | Content in $ThO_2$, p.p.m. | Separation factor [1] |
|---|---|---|---|---|---|---|---|---|
| Feed: | | | | | | | | |
| $ThO_2$ | 4,180 | 453 | 18,940 | | 6.2 | | | |
| $U_3O_8$ | 504 | | 2,280 | | | | $12\times10^4$ | |
| $(RE)_2O_3$ | 640 | | 2,900 | | | | $15\times10^4$ | |
| $P_2O_5$ | 150 | | 680 | | | | $4\times10^4$ | |
| $TiO_2$ | 24 | | 110 | | | | $6\times10^3$ | |
| $Fe_2O_3$ | 170 | | 780 | | | | $4\times10^4$ | |
| $Ce_2O_3$ | 280 | | 1,270 | | | | $7\times10^4$ | |
| Organic extract phase: | | | | | | | | |
| $ThO_2$ | 2,310 | 960 | 22,210 | 117 | 1.1 | | | |
| $U_3O_8$ | 300 | | 2,880 | 126 | | | $13\times10^4$ | |
| $(RE)_2O_3$ | <1 | | <9.6 | 64 | | | $<4\times10^2$ | >400 |
| $P_2O_5$ | <1 | | <9.6 | 103 | | | $<4\times10^2$ | >100 |
| $TiO_2$ | <0.2 | | <1.9 | 81 | | | <90 | >66 |
| $Fe_2O_3$ | 0.07 | | 0.67 | 102 | | | 30 | 1,300 |
| $Ce_2O_3$ | <1 | | <9.6 | 60 | | | $<4\times10^2$ | >175 |
| Aqueous raffinate: | | | | | | | | |
| $ThO_2$ | <0.5 | 670 | <3.4 | | 4.2 | >99.98 | | |
| $U_3O_8$ | 0.12 | | 0.8 | | | 99.97 | | |
| $(RE)_2O_3$ | 276 | | 1,850 | | | | | |
| $P_2O_5$ | 103 | | 690 | | | | | |
| $TiO_2$ | 13 | | 87 | | | | | |
| $Fe_2O_3$ | 120 | | 800 | | | | | |
| $Ce_2O_3$ | 112 | | 750 | | | | | |

[1] Separation factor = $\dfrac{\text{Content in ThO}_2\text{, p.p.m., in feed}}{\text{Content in ThO}_2\text{, p.p.m., in extractant}}$ The organic phase obtained and containing the uranium and thorium values was then separated and stripped with 0.2 N nitric acid followed by scrubbing with a 50–50 tributyl phosphate–Gulf Spray Naphtha mixture. The feed had a flow rate of 320 ml./hr., and the flow ratio for feed:scrub:stripping solution was 1.0:0.9:2.4. The stirrer speed was 1100 r.p.m. The results are given below in Table VI.

TABLE VI

| | Mg./100 ml. | Total vol., ml. | Total, mg. | Material bal., percent [1] | $HNO_3$, N | $U_3O_8$ in $ThO_2$, p.p.m. | $ThO_2$ in $U_3O_8$, p.p.m. | Separation factor |
|---|---|---|---|---|---|---|---|---|
| Feed: | | | | | | | | |
| $ThO_2$ | 2,180 | 156 | 3,400 | | 1.2 | | $8.7\times10^5$ | |
| $U_3O_8$ | 252 | | 392 | | | $1.2\times10^5$ | | |
| $(RE)_2O_3$ | <1 | | <1.56 | | | | | |
| $P_2O_5$ | <1 | | <1.56 | | | | | |
| $TiO_2$ | <0.2 | | <0.3 | | | | | |
| $Fe_2O_3$ | <0.1 | | <0.2 | | | | | |
| Aqueous stripping solution: | | | | | | | | |
| $ThO_2$ | 751 | 373 | 2,800 | 82 | 0.6 | | | |
| $U_3O_8$ | 0.06 | | 0.22 | | | 80 | | [2] 1,500 |
| $(RE)_2O_3$ | <0.5 | | <1.9 | | | | | |
| $P_2O_5$ | <0.5 | | <1.9 | | | | | |
| $TiO_2$ | <0.1 | | <0.4 | | | | | |
| $Fe_2O_3$ | 0.64 | | 2.4 | | | | | |
| Organic raffinate: | | | | | | | | |
| $ThO_2$ | <0.5 | 300 | <1.5 | | 0.05 | | <3,570 | [3] >2,440 |
| $U_3O_8$ | 140 | | 420 | 107 | | | | |
| $(RE)_2O_3$ | <0.5 | | <1.5 | | | | | |
| $P_2O_5$ | <0.5 | | <1.5 | | | | | |
| $TiO_2$ | <0.1 | | <0.3 | | | | | |
| $Fe_2O_3$ | <0.05 | | <0.15 | | | | | |

[1] The calculation of material balances for other than the uranium and thorium has no meaning since the quantities were all below the detectable level.
[2] Uranium separation factor, calculated as in Table IV.
[3] Thorium separation factor, calculated as in Table IV.

In this case, an aqueous thorium product solution containing seventy-five parts uranium per million parts of thorium and an organic uranium product solution containing less than thirty-six hundred parts of thorium per million parts of uranium were obtained.

*Example IV*

A feed solution was prepared from monazite sand as described above. The composition of this feed solution was as follows:

|  | G./liter |
|---|---|
| U | 1.4 |
| Th | 69.6 |
| RE | 12.4 |
| Fe | 3.7 |
| Ti | 3.9 |
| P | 0.3 |
| Cl | 0.8 |
| $HNO_3$ (free) | 472 (~7.5 N) |

This solution was contacted in a multistage extraction column of one inch diameter with a mixture of 50% by volume of tributyl phosphate and 50% of Gulf Spray Naphtha. The column consisted of a series of fourteen mixing stages separated by calming sections. The mixing, as in the previous instances, was accomplished by agitators attached to a shaft in the center of the column. The calming sections were formed of rolls of fine wire mesh (stainless steel) wrapped around the shaft.

The extraction step for coextraction of thorium and uranium values was based on the higher distribution coefficients of the thorium and uranium values as compared with those of the impurities such as rare earth metal values, iron and titanium when using a concentrated (6 N) nitric acid solution. Under these conditions, the distribution ratio for thorium is approximately one hundred times and that for uranium approximately one thousand times greater than those for the impurities.

The aqueous feed solution was introduced about a third of the way from the top of the column, while the organic extractant entered at the bottom of the column. A scrub solution consisting of 6 N nitric acid entered at the top of the column to wash any extracted impurities out of the solvent. The volume ratios of scrub:feed:solvent were 0.5:1.0:1.5.

The extraction yielded an organic phase containing less than forty-four parts of rare earth metal values, one hundred parts of iron, two hundred parts of titanium and less than seventy parts of phosphate anion values per million parts of thorium, as is shown in the following Table VII.

TABLE VII

|  | Aqueous feed to column | Organic solvent from column |
|---|---|---|
| Th, percent | 5 | 5.3 |
| U, p.p.m. of Th | $20 \times 10^3$ | $20 \times 10^3$ |
| RE, p.p.m. of Th | $18 \times 10^4$ | <44 |
| Ti, p.p.m. of Th | $56 \times 10^3$ | 200 |
| Fe, p.p.m. of Th | $53 \times 10^3$ | 100 |
| $PO_4^{--}$ as P, p.p.m. of Th | $62 \times 10^2$ | <70 |
| $HNO_3$, percent | 34 | 7.9 |

The extraction of the thorium and uranium was greater than 99%.

The next step in the solvent extraction operation was the selective separation of the thorium from the uranium and the organic solvent. This was accomplished, after separation of the thorium-uranium-containing solvent phase from the aqueous phase, by selectively stripping the thorium with a 0.5 N nitric acid whereby the thorium distributed in favor of the aqueous phase while the uranium preferentially remained in the organic phase. The difference in distribution ratios was a factor of 10.

Going more into detail for this selective stripping step, the organic feed solution resulting from the coextraction step, which was about 1 N in nitric acid, was introduced near the center of the extraction column described before. The strip aqueous medium, namely, deionized water, entered at the top of the column. A scrub solution containing a 50–50 mixture of tributyl phosphate and Gulf Spray Naphtha 0.4 N in nitric acid, was introduced at the bottom of the column to wash small amounts of uranium from the aqueous phase back into the organic phase. Nitric acid was not added directly to the aqueous stripping solution, since a sufficient amount of the acid transferred from the organic phase to the aqueous phase in the top section of the column to prevent back-extraction of the uranium. The volume ratio of strip:feed:scrub was 1.5:1:0.5. Table VIII gives the result of the selective stripping step.

TABLE VIII

|  | Organic feed solution | Aqueous solution, out of column | Organic solution, out of column |
|---|---|---|---|
| Th, percent | 5.3 | 2.9 |  |
| U, percent | 0.11 |  | 0.07 |
| U, p.p.m. of Th | $20 \times 10^3$ | 15 |  |
| Th, p.p.m. of U | $50 \times 10^6$ |  | <2,000 |

These results show that the concentration of uranium in the aqueous thorium product solution had been reduced to fifteen parts per million parts of thorium and that the concentration of the thorium in the organic uranium phase had been reduced to less than two thousand parts of thorium per million parts of uranium.

The final step in the extraction-separation process proper was the removal of the uranium from the organic solvent. This again was done in the extraction column described above by stripping the solvent with deionized water. In the preceding selective thorium stripping step, the nitric acid concentration of the solvent had been reduced to a value of less than 0.05 N which was low enough to make stripping of the uranium possible into the volume of water used, namely, one volume of water for each three volumes of organic phase.

As has been illustrated in Example IV, the organic solutions obtained after selective stripping of thorium may be furthermore stripped with water in order to back-extract the uranium values. By this, the solvent is reconditioned for recycling in the process.

Uranium and thorium may be recovered from the final aqueous solutions by means known to those skilled in the art. For instance, uranium may be precipitated as the hydroxide while the thorium is advantageously precipitated as the oxalate.

It will be understood that this invention is not to be limited to the details given herein but that it may be modified within the scope of the appended claims.

What is claimed is:

1. A process of separating uranium values from thorium values, comprising providing an aqueous phase of a maximum nitric acid content of 3 N and a tributyl phosphate phase, one of said phases initially containing said uranium and thorium values dissolved; thoroughly contacting said two phases whereafter said thorium values are preferentially contained in said aqueous phase, while said uranium values are preferentially contained in said tributyl phosphate phase; and separating said two phases.

2. A process of separating uranium values from thorium values, comprising providing an aqueous phase of a maximum nitric acid content of 3 N and a tributyl phosphate phase, one of said phases initially containing said uranium and thorium values dissolved and said tributyl phosphate phase being diluted with an equal volume of substantially water-immiscible organic solvent selected from the group consisting of hydrocarbon, ether, esters and mixtures thereof and having a lesser specific gravity than water; thoroughly contacting said two phases whereafter said thorium values are preferentially contained in said aqueous phase, while said uranium values are preferentially contained in said tributyl phosphate phase; and separating said two phases.

3. The process of claim 2 wherein the diluent is hexane.

4. The process of claim 2 wherein the diluent is dibutyl ether.

5. The process of claim 2 wherein the diluent is a kerosene fraction.

6. The process of claim 2 wherein the tributyl phosphate phase is pre-equilibrated with nitric acid.

7. The process of claim 2 wherein the tributyl phosphate phase initially contains the uranium and thorium values.

8. The process of claim 2 wherein the aqueous phase initially contains the uranium and thorium values.

9. The process of claim 2 wherein the nitric acid concentration of the aqueous phase ranges between 0.1 and 1 N.

10. The process of claim 9 wherein the nitric acid concentration of the aqueous phase ranges between 0.1 and 0.5 N.

11. A process of separating uranium values from thorium values contained in an aqueous solution comprising providing a nitric acid concentration of above 3 N in said aqueous solution, thoroughly contacting said aqueous solution with a mixture of substantially equal volumes of tributyl phosphate and a diluent whereby the uranium and thorium values are taken up by a tributyl phosphate phase, separating the tributyl phosphate phase from the nitric acid solution, contacting said tributyl phosphate phase with nitric acid of a concentration below 3 N whereby the thorium values are back-extracted into the nitric acid while the uranium values preferentially remain in the tributyl phosphate phase, and separating said tributyl phosphate phase from the nitric acid solution.

12. The process of claim 11 wherein the nitric acid concentration for coextraction of uranium and thorium values ranges from 3 to 9 N.

13. The process of claim 12 wherein the nitric acid concentration for coextraction of uranium and thorium values ranges from 6 to 7.5 N.

14. A process for the separation and recovery of thorium values and uranium values from nitric acid monazite sand solutions including rare earth metal and titanium values, comprising providing a nitric acid concentration of about 9 N in said solution whereby titanium phosphate precipitates, removing said precipitate, thereafter adjusting the nitric acid concentration to between 7 and 7.5 N, thoroughly contacting said nitric acid solution with a mixture of equal volumes of tributyl phosphate and a diluent whereby uranium and thorium values are extracted into a tributyl phosphate phase while the rare earth metal values remain in an aqueous phase, separating said tributyl phosphate phase from said aqueous phase, contacting said tributyl phosphate phase with nitric acid of a concentration below 3 N whereby the thorium values are back-extracted into the nitric acid while the uranium values preferentially remain in the tributyl phosphate phase, and separating said tributyl phosphate phase from the nitric acid solution.

15. The process of claim 14 wherein the nitric acid solution for selective back-extraction of the thorium values has a concentration of from 0.1 to 1 N.

16. The process of claim 15 wherein the nitric acid solution for selective back-extraction of the thorium values has a concentration of from 0.1 to 0.5 N.

17. The process of claim 14 wherein the uranium values left in the tributyl phosphate phase are back-extracted by thoroughly contacting with a nonacid aqueous medium.

18. The process of claim 17 wherein the aqueous medium is water.

19. The process of claim 17 wherein the aqueous medium is a carbonate solution.

References Cited in the file of this patent

UNITED STATES PATENTS

| | | |
|---|---|---|
| 1,966,729 | Loomis | July 17, 1934 |
| 1,968,544 | Vana | July 31, 1934 |
| 2,225,633 | Hill et al. | Dec. 24, 1940 |
| 2,227,833 | Hixson et al. | Jan. 7, 1941 |

OTHER REFERENCES

Templeton et al.: Journal of Physical and Colloid Chemistry, vol. 51, pages 1441–1449 (1947).

Warf: Extraction of Cerium (IV) Nitrate by Butyl Phosphate, AECD–2524, declassified March 11, 1949, p. 6. Publ. by Technical Information Branch, U.S. Atomic Energy Commission, Oak Ridge, Tenn.